(12) United States Patent
Wu

(10) Patent No.: US 11,701,838 B2
(45) Date of Patent: Jul. 18, 2023

(54) WATER SOLUBLE WAXY SUPPORT MATERIALS FOR THREE-DIMENSIONAL PRINTING APPLICATIONS

(71) Applicant: 3D Systems, Incorporated, Rock Hill, SC (US)

(72) Inventor: Bo Wu, Wilsonville, OR (US)

(73) Assignee: 3D SYSTEMS, INC., Rock Hill, SC (US)

( * ) Notice: Subject to any disclaimer, the term of this patent is extended or adjusted under 35 U.S.C. 154(b) by 301 days.

(21) Appl. No.: 17/155,498

(22) Filed: Jan. 22, 2021

(65) Prior Publication Data

US 2021/0229368 A1    Jul. 29, 2021

Related U.S. Application Data

(60) Provisional application No. 62/965,246, filed on Jan. 24, 2020.

(51) Int. Cl.
| | |
|---|---|
| *B29C 64/40* | (2017.01) |
| *B33Y 70/00* | (2020.01) |
| *C08F 20/58* | (2006.01) |
| *C08G 18/48* | (2006.01) |
| *C08G 18/73* | (2006.01) |
| *B33Y 40/20* | (2020.01) |

(52) U.S. Cl.
CPC .............. *B29C 64/40* (2017.08); *B33Y 70/00* (2014.12); *C08F 20/58* (2013.01); *C08G 18/4833* (2013.01); *C08G 18/73* (2013.01); *B33Y 40/20* (2020.01)

(58) Field of Classification Search
CPC ......... B33Y 70/00; B33Y 40/20; C08F 20/58; C08G 18/4833
See application file for complete search history.

(56) References Cited

U.S. PATENT DOCUMENTS

| | | |
|---|---|---|
| 4,028,313 A | 6/1977 | Muller et al. |
| 2002/0042492 A1 | 4/2002 | Shen et al. |
| 2002/0102382 A1 | 8/2002 | Kwong et al. |
| 2019/0233663 A1* | 8/2019 | Rabasco .................. C09D 7/00 |

FOREIGN PATENT DOCUMENTS

| | | |
|---|---|---|
| EP | 1104775 A1 | 6/2001 |
| WO | 2015038714 A1 | 3/2015 |

OTHER PUBLICATIONS

PCT International Search Report for International Search Authority for PCT/US2021/014557 dated May 7, 2021 (6 pages).
PCT International Written Opinion for International Search Authority for PCT/US2021/014557 dated May 7, 2021 (6 pages).

* cited by examiner

*Primary Examiner* — Catherine S Branch
(74) *Attorney, Agent, or Firm* — Maynard Nexsen PC; John P. Zimmer

(57) ABSTRACT

In one aspect, urethane waxes are described herein comprising a reaction product between monofunctional polyethylene oxide and polyisocyanate. In some embodiments, the urethane waxes are combined with other components to provide support materials for use in three-dimensional printing applications. A support material ink, for example, comprises a urethane wax comprising a reaction product between monofunctional polyethylene oxide and polyisocyanate. The support material ink, in some embodiments, further comprises monomeric curable material, oligomeric curable material, or mixtures thereof.

18 Claims, No Drawings

WATER SOLUBLE WAXY SUPPORT MATERIALS FOR THREE-DIMENSIONAL PRINTING APPLICATIONS

RELATED APPLICATION DATA

The present application claims priority pursuant to 35 U.S.C. § 119(e) to U.S. Provisional Patent Application Ser. No. 62/965,246 filed Jan. 24, 2020, which is incorporated herein by reference in its entirety.

FIELD

The present invention relates to support materials for three-dimensional printing applications and, in particular, to water soluble support materials comprising a wax component.

BACKGROUND

Some commercially available 3D printers or additive manufacturing systems, such as the ProJet® 3D Printers manufactured by 3D Systems of Rock Hill, S.C., use inks, including build materials and support materials, that are jetted through heads as liquids to form various 3D objects, articles, or parts. Other 3D printing systems also use an ink that is jetted through a print head or otherwise dispensed onto a substrate. In some instances, the inks are solid at ambient temperatures and convert to liquids at elevated jetting temperatures. Such phase change materials include support materials comprising various wax mixtures such as paraffin, microcrystalline waxes, polyethylene waxes, and fatty amide waxes. These support materials are generally not water soluble and are removed from the printed article by heating and/or with solvent such as hot isopropyl alcohol (IPA).

This removal process has a significant disadvantage of weakening the build material and compromising mechanical properties of the finished three-dimensional article. Weakening the mechanical properties can render finished three-dimensional article unsuitable for its intended application.

SUMMARY

In one aspect, urethane waxes are described herein comprising a reaction product between monofunctional polyethylene oxide and polyisocyanate. In some embodiments, the urethane waxes are combined with other components to provide support material inks for use in three-dimensional printing applications. A support material ink, for example, comprises a urethane wax comprising a reaction product between monofunctional polyethylene oxide and polyisocyanate. The support material ink, in some embodiments, further comprises monomeric curable material, oligomeric curable material, or mixtures thereof. In some embodiments, the support material ink when cured exhibits water solubility, thereby facilitating post-print processing of three-dimensional printed articles.

In another aspect, methods of printing a three-dimensional article are described herein. A method, in some embodiments, comprises depositing one or more layers of support material ink, curing the deposited layers of support material ink, and depositing a build material ink on the cured support material ink. The support material ink comprises monomeric curable material, oligomeric curable material, or mixtures thereof, and a urethane wax comprising a reaction product between monofunctional polyethylene oxide and polyisocyanate.

These and other embodiments are further described in the following detailed description.

DETAILED DESCRIPTION

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9. Similarly, a stated range of "1 to 10" should be considered to include any and all subranges beginning with a minimum value of 1 or more and ending with a maximum value of 10 or less, e.g., 1 to 5, or 4 to 10, or 3 to 7, or 5 to 8.

All ranges disclosed herein are also to be considered to include the end points of the range, unless expressly stated otherwise. For example, a range of "between 5 and 10," "from 5 to 10," or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "three-dimensional printing system," "three-dimensional printer," "printing," and the like generally describe various solid freeform fabrication techniques for making three-dimensional articles or objects by stereolithography, selective deposition, jetting, fused deposition modeling, multi-jet modeling, and other additive manufacturing techniques now known in the art or that may be known in the future that use a build material or ink to fabricate three-dimensional objects.

I. Urethane Waxes

In one aspect, urethane waxes are described herein comprising a reaction product between monofunctional polyethylene oxide and polyisocyanate. Any monofunctional polyethylene oxide not inconsistent with the technical objectives described herein can be employed. In some embodiments, monofunctional polyethylene oxide is commercially available from Dow Chemical Company under the CARBOWAX™ trade designation. For example, monofunctional polyethylene oxide, in some embodiments, can be CARBOWAX™ MPEG 350, CARBOWAX™ MPEG 550, CARBOWAX™ 750, or mixtures thereof.

Additionally, any polyisocyanate not inconsistent with the technical objectives described herein can be employed in the reaction product. In some embodiments, the polyisocyanate comprises a diisocyanate, triisocyanate, or mixtures thereof. Diisocyante, for example, can comprise alkyl-diisocyanate such as hexane diisocyanate (HDI) or trimethylhexane diisocyanate (TMHDI), in some embodiments.

Specific formula of the reaction product will be dependent upon identity of the monofunctional polyethylene oxide and polyisocyanate. In some embodiments, the reaction product comprises stoichiometric equivalent amounts of the monofunctional polyethylene oxide and polyfunctional isocyanate, such that all or substantially all isocyanate groups are reacted. The reaction product, in some embodiments, is of the formula:

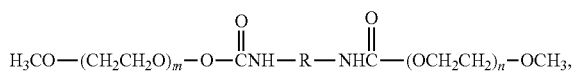

wherein R is selected from the group consisting of alkyl, cycloalkyl, heterocycloalkyl, aryl, and heteroaryl, and m and n are integers independently selected from 6 to 20. In some embodiments, R is $C_6$-$C_{20}$ alkyl. Moreover, m and n can be equal or unequal depending on the reactants employed in forming the reaction product.

II. Support Material Inks

In another aspect, support material inks are described herein for three-dimensional printing applications. A support material ink comprises a urethane wax comprising a reaction product between monofunctional polyethylene oxide and polyisocyanate. The reaction product of the urethane wax can have any composition and/or properties described in Section I hereinabove. Moreover, the urethane wax can be present in the support ink composition in any desired amount. In some embodiments, the amount of urethane wax is selected according to several considerations including, but not limited to, the desired mechanical and/or water solubility properties of the cured support material ink. The urethane wax, in some embodiments, is present in an amount of 30 to 55 weight percent or 35 to 45 weight percent of the support material ink.

The support material ink, in some embodiments, further comprises monomeric curable material, oligomeric curable material, or mixtures thereof. Any monomeric curable material and/or oligomeric material not inconsistent with the technical objectives described herein can be employed in the support material ink composition. In some embodiments, monomeric curable material and/or oligomeric curable material is selected in accordance with water solubility characteristics of the cured support ink discussed further herein. In some embodiments, for example, monomeric curable material and/or oligomeric curable material may comprise species including one or more polar moieties or hydrophilic moieties for achieving desired water solubility characteristics of the cured support material ink. In some embodiments, the monomeric and/or oligomeric curable material comprises one or more species of acrylate monomer and/or oligomer, including but not limited to monofunctional acrylates, polyfunctional acrylates, and/or acrylate derivatives, such as acryloyl morpholine and related species.

A curable material, for reference purposes herein, comprises a chemical species that includes one or more curable or polymerizable moieties. A "polymerizable moiety," for reference purposes herein, comprises a moiety that can be polymerized or cured in the printing of a 3D article or object. Such polymerizing or curing can be carried out in any manner not inconsistent with the objectives of the present disclosure. In some embodiments, for example, polymerizing or curing comprises irradiating a polymerizable or curable material with electromagnetic radiation having sufficient energy to initiate a polymerization or cross-linking reaction. For instance, in some cases, ultraviolet (UV) radiation can be used. Thus, in some instances, a polymerizable moiety comprises a photo-polymerizable or photo-curable moiety, such as a UV-polymerizable moiety. In some embodiments, a curable material described herein is photo-polymerizable or photo-curable at wavelengths ranging from about 300 nm to about 420 nm or from about 320 nm to about 410 nm. Alternatively, in other instances, a curable material is photo-polymerizable at visible wavelengths of the electromagnetic spectrum.

Moreover, a polymerization reaction, in some cases, comprises a free radical polymerization reaction, such as that between points of unsaturation, including points of ethyleneic unsaturation. Other polymerization reactions may also be used. As understood by one of ordinary skill in the art, a polymerization reaction used to polymerize or cure a curable material described herein can comprise a reaction of a plurality of "monomers" or chemical species having one or more functional groups or moieties that can react with one another to form one or more covalent bonds.

One non-limiting example of a polymerizable moiety of a curable material described herein is an ethyleneically unsaturated moiety, such as a vinyl moiety, allyl moiety, or (meth)acrylate moiety, where the term "(meth)acrylate" throughout this disclosure includes acrylate or methacrylate or a mixture or combination thereof.

Additionally, a monomeric curable material and/or an oligomeric curable material described herein can comprise a monofunctional, difunctional, trifunctional, tetrafunctional, pentafunctional, or higher functional curable species. A "monofunctional" curable species, for reference purposes herein, comprises a chemical species that includes one curable or polymerizable moiety. Similarly, a "difunctional" curable species comprises a chemical species that includes two curable or polymerizable moieties; a "trifunctional" curable species comprises a chemical species that includes three curable or polymerizable moieties; a "tetrafunctional" curable species comprises a chemical species that includes four curable or polymerizable moieties; and a "pentafunctional" curable species comprises a chemical species that includes five curable or polymerizable moieties. Thus, in some embodiments, a monofunctional curable material of an ink described herein comprises a mono(meth)acrylate or acryloyl morpholine, a difunctional curable material of an ink described herein comprises a di(meth)acrylate, a trifunctional curable material of an ink described herein comprises a tri(meth)acrylate, a tetrafunctional curable material of an ink described herein comprises a tetra(meth)acrylate, and a pentafunctional curable material of an ink described herein comprises a penta(meth)acrylate. Other monofunctional, difunctional, trifunctional, tetrafunctional, and pentafunctional curable materials may also be used.

Any monomeric curable material or combination of monomeric curable materials not inconsistent with the objectives of the present disclosure may be employed with the urethane wax in the support material ink composition. As described herein, species of the monomeric curable material may comprise one or more polar or hydrophilic moieties for achieving desired water solubilities of the cured support material ink. In some cases, a monomeric curable material of a support material ink described herein comprises one or more species of acrylates, (meth)acrylates, such as one or more monofunctional, difunctional, trifunctional, tetrafunctional, and/or pentafunctional (meth)acrylates. In some embodiments, for instance, a monomeric curable material comprises methyl (meth)acrylate, ethyl (meth)acrylate, n-propyl (meth)acrylate, n-butyl (meth) acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, acryloyl morpholine, 2-hydroxyethyl (meth)acrylate, 2- or 3-hydroxypropyl (meth)acrylate, 2-methoxyethyl (meth)acrylate, 2-ethoxyethyl (meth)acrylate, 2- or 3-ethoxypropyl (meth)acrylate, tetrahydrofurfuryl methacrylate, isobornyl (meth)acrylate, 2-(2-ethoxyethoxy)ethyl acrylate, cyclohexyl methacrylate, 2-phenoxyethyl acrylate, glycidyl acrylate, isodecyl acrylate, 2-phenoxyethyl (meth)acrylate, lauryl methacrylate, or a combination thereof. In some embodiments, a monomeric curable material comprises one or more of allyl acrylate, allyl methacrylate, triethylene glycol di(meth)acrylate, tricyclodecane dimethanol diacrylate, and cyclohexane dimethanol diacrylate. Additionally, in some cases, a monomeric curable material comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, tripropylene glycol, 1,4-dihydroxymethylcyclohexane, 2,2-bis(4-hydroxycyclohexyl)propane or bis(4-hydroxycyclohexyl)methane, hydroquinone, 4,4'-dihydroxybiphenyl, bisphenol A, bisphenol F, or bisphenol S. A monomeric curable material described herein may also comprise 1,1-trimethylolpropane tri(meth)acrylate, pentaerythritol monohydroxy tri(meth)acrylate, dipentaerythritol monohydroxy penta(meth)acrylate, and/or bis(trimethylolpropane) tetra(meth) acrylate. Further, in some cases, a monomeric curable material can comprise an ethoxylated or propoxylated species, such as ethoxylated or propoxylated neopentyl glycol, ethoxylated or propoxylated bisphenol A, ethoxylated or propoxylated bisphenol F, ethoxylated or propoxylated bisphenol S, ethoxylated or propoxylated 1,1,1-trimethylolpropanetri(meth)acrylate, or ethoxylated or propoxylated glycerol tri(meth)acrylate. In some cases, a monomeric curable material comprises a cycloaliphatic epoxy.

Any oligomeric curable material or combination of oligomeric curable materials not inconsistent with the objectives of the present disclosure may be employed with the urethane wax in the support material ink composition. As described herein, species of the oligomeric curable material may comprise one or more polar or hydrophilic moieties for achieving desired water solubilities of the cured support material ink.

In some cases, an oligomeric curable material comprises a polyester (meth)acrylate oligomer, a urethane (meth)acrylate oligomer, or an epoxy(meth)acrylate oligomer. Further, in some embodiments, an oligomeric curable material described herein comprises an aliphatic polyester urethane acrylate oligomer and/or an acrylate amine oligomeric resin, such as EBECRYL 7100. In some cases, an oligomeric curable material described herein comprises a polypropylene glycol mono(meth)acrylate or polyethylene glycol mono (meth)acrylate. In some embodiments, an oligomeric curable material comprises a monofunctional aliphatic urethane (meth)acrylate. Moreover, in some cases, an oligomeric curable material comprises a diacrylate and/or dimethacrylate ester of an aliphatic, cycloaliphatic or aromatic diol, including polyethylene glycol, ethoxylated or propoxylated neopentyl glycol, ethoxylated or propoxylated bisphenol A, ethoxylated or propoxylated bisphenol F, ethoxylated or propoxylated bisphenol S, ethoxylated or propoxylated 1,1,1-trimethylolpropanetri(meth)acrylate, or ethoxylated or propoxylated glycerol tri(meth)acrylate. An oligomeric material may also comprise a cycloaliphatic epoxy.

Some non-limiting examples of commercially available oligomeric curable materials useful in some embodiments described herein include the following: alkoxylated tetrahydrofurfuryl acrylate, commercially available from SARTOMER under the trade name SR 611; monofunctional urethane acrylate, commercially available from RAHN USA under the trade name GENOMER 1122; an aliphatic urethane diacrylate, commercially available from ALLNEX under the trade name EBECRYL 8402; a multifunctional acrylate oligomer, commercially available from DYMAX Corporation under the trade name BR-952; and aliphatic polyether urethane acrylate, commercially available from DYMAX Corporation under the trade name BR-371 S. Other commercially available oligomeric curable materials may also be used.

The monomeric curable material or oligomeric curable material can be present in the support material ink composition in any desired amount. In some embodiments, the amount of monomeric curable material or oligomeric curable material is selected according to several considerations including, but not limited to, the desired mechanical and/or water solubility properties of the cured support material. In some embodiments, the monomeric curable material or oligomeric curable material is present in an amount of 40-65 weight percent of the support material ink.

A mixture or monomeric curable material and oligomeric curable material can also be present with the urethane wax in the support material ink. In some embodiments, a mixture of monomeric curable material and oligomeric curable material is present in an amount of 40 to 65 weight percent of the support material ink. Any desired ratio of monomeric curable material to oligomeric curable material can be employed in the support material ink. Ratio of monomeric curable material to oligomeric curable material can be selected according to several considerations including, but not limited to, the desired mechanical and/or water solubility properties of the cured support material ink.

Inks described herein also comprise one or more photoinitiators. Any photoinitiator not inconsistent with the objectives of the present disclosure may be used in an ink described herein. In some embodiments, for example, the photoinitiator comprises an alpha-cleavage type (unimolecular decomposition process) photoinitiator or a hydrogen abstraction photosensitizer-tertiary amine synergist, operable to absorb light between about 250 nm and about 420 nm or between about 300 nm and about 410 nm, to yield free radical(s). Examples of alpha cleavage photoinitiators are Irgacure 184 (CAS 947-19-3), Irgacure 369 (CAS 119313-12-1), and Irgacure 819 (CAS 162881-26-7). An example of a photosensitizer-amine combination is Darocur BP (CAS 119-61-9) with diethylaminoethylmethacrylate.

In addition, in some instances, photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, such as 2,4,6-trimethylbenzoyldiphenylphosphine oxide (Lucirin TPO), benzophenones, such as benzophenone and 4,4'-bis(N,N'-dimethylamino) benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

Photoinitiators can also comprise photoinitiators operable for use with a HeCd laser radiation source, including acetophenones, 2,2-dialkoxybenzophenones and 1-hydroxyphenyl ketones, such as 1-hydroxycyclohexyl phenyl ketone or 2-hydroxyisopropyl phenyl ketone (=2-hydroxy-2,2-dimethylacetophenone). Additionally, in some cases, photoinitiators comprise photoinitiators operable for use with an Ar laser radiation source including benzil ketals, such as benzil dimethyl ketal. In some embodiments, a suitable photoinitiator comprises an α-hydroxyphenyl ketone, benzil dimethyl ketal or 2,4,6-trimethylbenzoyldiphenylphosphine oxide or a mixture thereof.

Another class of photoinitiators that may be included in an ink described herein comprises ionic dye-counter ion compounds capable of absorbing actinic radiation and generating free radicals for polymerization initiation. Some ionic dye-counter ion compounds and their mode of operation are disclosed in EP-A-0 223 587 and U.S. Pat. Nos. 4,751,102; 4,772,530; and 4,772,541. A photoinitiator described herein may also be a cationic photoinitiator such as a triphenyl sulphonium photoinitiator.

A photoinitiator can be present in a support material ink described herein in any amount not inconsistent with the objectives of the present disclosure. In some embodiments, a photoinitiator is present in an ink in an amount of up to about 5 wt. %, up to about 4 wt. %, or up to about 3 wt. %, based on the total weight of the ink. In some cases, a photoinitiator is present in an amount of about 0.1-5 wt. %, 0.1-4 wt. %, 0.1-3.5 wt. %, 0.1-2 wt. %, 0.5-5 wt. %, 0.5-4 wt. %, 0.5-3.5 wt. %, 1-5 wt. %, 1-4 wt. %, 1-3.5 wt. %, 2-5 wt. %, or 2-4 wt. %.

Turning to possible additional components of support material inks described herein, inks described herein can further comprise one or more photosensitizers. In general, such a sensitizer can be added to an ink to increase the effectiveness of one or more photoinitiators that may also be present. In some cases, a sensitizer comprises isopropylthioxanthone (ITX) or 2-chlorothioxanthone (CTX).

A sensitizer can be present in the support material ink in any amount not inconsistent with the objectives of the present disclosure. In some embodiments, a sensitizer is present in an amount ranging from about 0.1 wt. % to about 2 wt. % or from about 0.5 wt. % to about 1 wt. %, based on the total weight of the support material ink. However, in other cases, an ink described herein excludes a sensitizer such as described above.

Turning to another possible component of support material inks described herein, inks described herein can also comprise at least one colorant. Such a colorant of an ink described herein can be a particulate colorant, such as a particulate pigment, or a molecular colorant, such as a molecular dye. Any such particulate or molecular colorant not inconsistent with the objectives of the present disclosure may be used. In some cases, for instance, the colorant of an ink comprises an inorganic pigment, such as $TiO_2$ and/or ZnO. In some embodiments, the colorant of an ink comprises a colorant for use in a RGB, sRGB, CMY, CMYK, L*a*b*, or Pantone® colorization scheme. Moreover, in some cases, a particulate colorant described herein has an average particle size of less than about 5 μm, or less than about 1 μm. In some instances, a particulate colorant described herein has an average particle size of less than about 500 nm, such as an average particle size of less than about 400 nm, less than about 300 nm, less than about 250 nm, less than about 200 nm, or less than about 150 nm. In some instances, a particulate colorant has an average particle size of about 50-5000 nm, about 50-1000 nm, or about 50-500 nm.

A colorant can be present in an ink described herein in any amount not inconsistent with the objectives of the present disclosure. In some cases, colorant is present in the ink in an amount up to about 2 wt. %, or an amount of about 0.005-2 wt. %, 0.01-2 wt. %, 0.01-1.5 wt. %, 0.01-1 wt. %, 0.01-0.5 wt. %, 0.1-2 wt. %, 0.1-1 wt. %, 0.1-0.5 wt. %, or 0.5-1.5 wt. %, based on the total weight of the support material ink.

Moreover, support material inks described herein, in some embodiments, further comprise one or more polymerization inhibitors and/or stabilizing agents. A polymerization inhibitor can be added to the ink to provide additional thermal stability to the composition. Any polymerization inhibitor not inconsistent with the objectives of the present disclosure may be used. Moreover, a polymerization inhibitor can retard or decrease the rate of polymerization, and/or prevent polymerization from occurring for some period of time or "induction time" until the polymerization inhibitor is consumed. In some embodiments, for example, a polymerization inhibitor comprises a nitrosamine inhibitor, such as Q-1301 commercially available from FujiFilm Wako Chemicals Europe GmbH of Neuss, Germany. Further, in some cases, a polymerization inhibitor described herein is an "addition type" inhibitor. An inhibitor described herein can also be a "chain transfer type" inhibitor. In some instances, a suitable polymerization inhibitor comprises methoxyhydroquinone (MEHQ).

A stabilizing agent, in some embodiments, comprises one or more anti-oxidants. A stabilizing agent can comprise any anti-oxidant not inconsistent with the objectives of the present disclosure. In some cases, suitable anti-oxidants include various aryl compounds, including butylated hydroxytoluene (BHT), which can also be used as a polymerization inhibitor in some embodiments described herein. More generally, a single species may serve as both a stabilizing agent and a polymerization inhibitor. It is also possible, in some cases, to use a plurality of inhibitors and/or stabilizing agents, wherein differing inhibitors and/or stabilizers provide differing effects and/or work synergistically.

A polymerization inhibitor and/or a stabilizing agent can be present in the support material ink in any amount not inconsistent with the objectives of the present disclosure. In some embodiments, a polymerization inhibitor is present in an amount ranging from about 0.01 wt. % to about 2 wt. % or from about 0.05 wt. % to about 1 wt. %. Similarly, in some cases, a stabilizing agent is present in an ink in an amount ranging from about 0.1 wt. % to about 5 wt. %, from about 0.5 wt. % to about 4 wt. %, or from about 1 wt. % to about 3 wt. %, based on the total weight of the ink.

In some embodiments, support material inks described herein further comprise one or more surface tension modifiers or additives. Surface tension modifiers or additives can reduce surface tension and promote wetting, in some embodiments. Suitable surface tension modifiers can include silicone-containing compounds such as modified polydimethylsiloxanes. A surface tension modifier, in some embodiments, comprises BYK-307 commercially available from BYK Additives & Instruments. Surface tension modifiers or additives can generally be present in an amount of 0.1 wt. % to 1 wt. % based on total weight of the support material ink.

Support material inks described herein, in some embodiments, exhibit viscosity of 9-12 centipoise (cps) at 80° C.

Support material inks described herein can also exhibit a variety of desirable properties when cured by exposure to the proper wavelengths of radiation or other energy source. In some embodiments, the support material ink when cured has water solubility of at least 5 g in 100 g water at 35° C. The support material ink when cured can also exhibit water solubility having a value selected from Table I.

TABLE 1

Water Solubility of Cured Support Material Ink (Water 35° C.)

10-80 g/100 g water
25-75 g/100 g water
30-60 g/100 g water
40-50 g/100 g water

Water solubility of the cured support ink material can facilitate post processing of the three-dimensional printed article without compromising or weakening mechanical properties of the printed article. As described herein, prior support ink materials when cured require alcohol solvent for removal from the build material in post processing. The alcohol solvent can substantially weaken one or more mechanical properties of the printed article. Water soluble cured support ink materials described herein obviate the use of such solvents for removal, thereby maintaining mechanical and structural integrity of the build material and finished printed article.

Support material inks described herein can also exhibit desirable mechanical properties when cured. In some embodiments, cured support material ink has a flexural modulus of 950 to 1050 MPa, and a flexural stress of 9-11 MPa. Cured support material ink may also exhibit Shore A hardness of 90-110.

III. Methods of Printing a Three-Dimensional Article

In another aspect, methods of printing a three-dimensional article are described herein. A method, in some embodiments, comprises depositing one or more layers of support material ink, curing the deposited layers of the support material ink, and depositing a build material ink on the cured support material ink. The support material ink comprises monomeric curable material, oligomeric curable material, or mixtures thereof, and a urethane wax comprising a reaction product between monofunctional polyethylene oxide and polyisocyanate. The support material ink can have any composition and/or properties described in Section II hereinabove. The method further comprises separating the build material of the printed article from the support material by dissolving the support material in water.

In some instances, the support material ink described herein and a build material ink are selectively deposited in a fluid state onto a substrate, such as a build pad of a 3D printing system. Selective deposition may include, for example, depositing the inks according to preselected CAD parameters. For example, in some embodiments, a CAD file drawing corresponding to a desired 3D article to be printed is generated and sliced into a sufficient number of horizontal slices. Then, the support and/or build inks are selectively deposited, layer by layer, according to the horizontal slices of the CAD file drawing to print the desired 3D article. A "sufficient" number of horizontal slices is the number necessary for successful printing of the desired 3D article, e.g., to produce it accurately and precisely.

Further, in some embodiments, a preselected amount of support material ink and/or build material ink described herein are heated to the appropriate temperature and jetted through a print head or a plurality of print heads of a suitable inkjet printer to form a layer on a print pad in a print chamber. In some cases, each layer of ink is deposited according to preselected CAD parameters. A suitable print head to deposit the ink, in some embodiments, is a piezoelectric print head. Additional suitable print heads for the deposition of ink and support material described herein are commercially available from a variety of ink jet printing apparatus manufacturers. For example, Xerox, Hewlett Packard, or Ricoh print heads may be used in some instances.

The build material employed in methods described herein can comprise any build material exhibiting compatibility with cured support material ink described in Section II above. In some embodiments, for example, suitable build materials do not separate from the cured support material ink. Moreover, suitable build materials do not exhibit water solubility, rendering the build materials compatible with post processing operations wherein the cured support material ink is removed by exposure to water. In some embodiments, the build material is wax or wax-based. Wax or wax-based build materials may comprise non-polar wax, polar wax, or mixtures thereof. Non-polar wax of a build material, in some embodiments, comprises paraffin-based wax, polyolefin wax, or mixtures thereof. Additionally, polar wax of a build material can comprise one or more carboxylic acid waxes and/or alcohol waxes, including monohydric alcohol waxes. Waxy build materials may also comprise one or more rosin esters.

These and other embodiments are further illustrated in the following non-limiting examples.

Example 1—Support Material Inks

Support material inks having the compositional parameters in Table II were prepared.

TABLE II

Support Material Inks (components in wt. %)

| | Ink ID | | | | |
|---|---|---|---|---|---|
| | 1 | 2 | 3 | 4 | 5 |
| Urethane Wax 1 | 50 | | | | |
| Urethane Wax 2 | | 40 | 51 | | |
| Urethane Wax 3 | | | | 40 | |
| Urethane Wax 4 | | | | | 40 |
| Monomeric curable material | 49 | 59 | 48 | 59 | 59 |
| Photoinitiator | 1 | 1.1 | 0.9 | 1.2 | 1.2 |
| Inhibitor | 0.21 | 0.084 | 0.037 | 0.018 | 0.018 |
| Viscosity (cps) 80° C. | 10.2 | 9.8 | 14 | 11.7 | 11.6 |

Weight percent values in Table II are approximate and, therefore, may sum to slightly below or slightly above 100 weight percent. Urethane wax 1 was the reaction product of CARBOWAX™ MPEG 350 with HDI in the presence of tin catalyst. Urethane wax 2 was the reaction product of CARBOWAX™ MPEG 550 with HDI in the presence of tin catalyst. Moreover, Urethane wax 3 was the reaction product of CARBOWAX™ MPEG 750 with HDI in the presence of tin catalyst. Additionally, Urethane wax 4 was the reaction product of CARBOWAX™ MPEG 550 with trimethylhexane diisocyanate (TMHDI) in the presence of tin catalyst. The monomeric curable material was acryloyl morpholine for each support material ink, and the photoinitiator was Irgacure 819. Polymerization inhibitors of Q-1301 and BHT were used in a mixture.

Support material inks 2 and 3 were UV cured for water solubility testing. Support material ink 2, when cured, exhibited water solubility limit of greater than 46 g in 100 g of water at 35° C. Support material ink 3, when cured, exhibited water solubility limit of greater than 45 g in 100 g of water at 35° C.

Test bars of support material inks 2 and 3 were printed on a Projet® MJP 2500 printer commercially available from 3D Systems of Rock Hill, S.C. The printed test bars were tested for flexural strength and hardness. The results are provided in Table 3.

TABLE 3

Mechanical Properties of Cured Support Material Inks

| Ink ID | Shore A Hardness | Flexural Modulus (MPa) | Flexural Strength (MPa) |
|---|---|---|---|
| 2 | 97 | 995 | 10.4 |
| 3 | 98 | — | — |

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A urethane wax comprising:
a reaction product between monofunctional polyethylene oxide and polyisocyanate,
wherein the reaction product is of the formula:

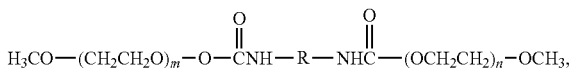

wherein R is selected from the group consisting of alkyl, cycloalkyl, heterocycloalkyl, aryl, and heteroaryl, and m and n are integers independently selected from 6 to 20; and wherein m and n are unequal.

2. The urethane wax of claim 1, wherein R is alkyl.

3. A support material ink for use in three-dimensional printing comprising:
a urethane wax comprising the reaction product between monofunctional polyethylene oxide and polyisocyanate; and
a monomeric curable material, an oligomeric curable material, or mixtures thereof.

4. The support material ink of claim 3, wherein the polyisocyanate comprises diisocyanate.

5. The support material ink of claim 4, wherein the diisocyanate is alkyl-diisocyanate.

6. The support material ink of claim 3 wherein the reaction product is of the formula:

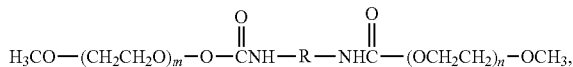

wherein R is selected from the group consisting of alkyl, cycloalkyl, heterocycloalkyl, aryl, and heteroaryl, and m and n are integers independently selected from 6 to 20.

7. The support material ink of claim 3, wherein the urethane wax is present in an amount of 30 to 55 weight percent of the support material ink.

8. The support material ink of claim 3, wherein the monomeric curable material comprises one or more monofunctional species.

9. The support material of claim 8, wherein the monofunctional species comprises one or more polar moieties.

10. The support material ink of claim 9, wherein the monomeric curable material comprises one or more species of acrylates or acrylate derivatives.

11. The support material ink of claim 9, wherein the monomeric curable material comprises acryloyl morpholine.

12. The support material ink of claim 3, wherein the monomeric curable material is present in an amount of 40 to 65 weight percent of the support material ink.

13. The support material ink of claim 3 further comprising one or more additives selected from the group consisting of photoinitiators, inhibitors, stabilizing agents, sensitizers, and mixtures thereof.

14. The support material ink of claim 3, wherein the support material ink when cured has water solubility of at least 5 g in 100 g water at 35° C.

15. The support material ink of claim 14, wherein the water solubility is 5 g to 100 g in 100 g water at 35° C.

16. The support material ink of claim 3, wherein the support material ink when cured has a Shore A hardness of 80 to 110.

17. A method of printing a three-dimensional article comprising:
depositing layers of a support material ink;
curing the deposited layer of the support material ink, wherein the support material ink comprises the ink of claim 3; and
depositing a build material ink on the cured support material ink.

18. The method of claim 17 further comprising dissolving the cured support material ink with water.

* * * * *